(No Model.) 2 Sheets—Sheet 2.
J. T. GRIFFITH.
FERTILIZER DISTRIBUTER.
No. 476,631. Patented June 7, 1892.
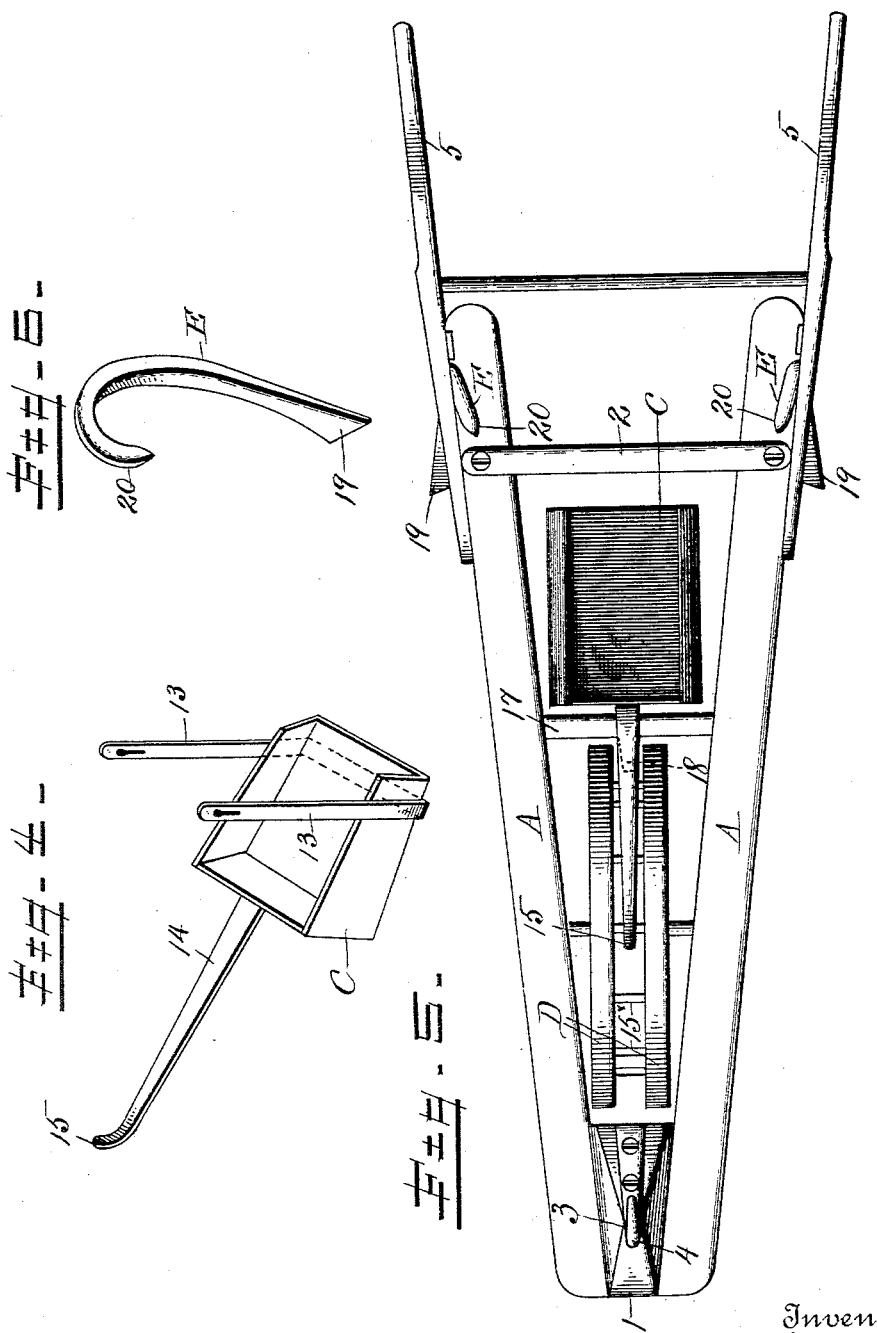
Witnesses
A. B. Blackwood
Wm. H. Bates
Inventor
Joseph T. Griffith
by A. G. Heylmun,
Attorney

UNITED STATES PATENT OFFICE.

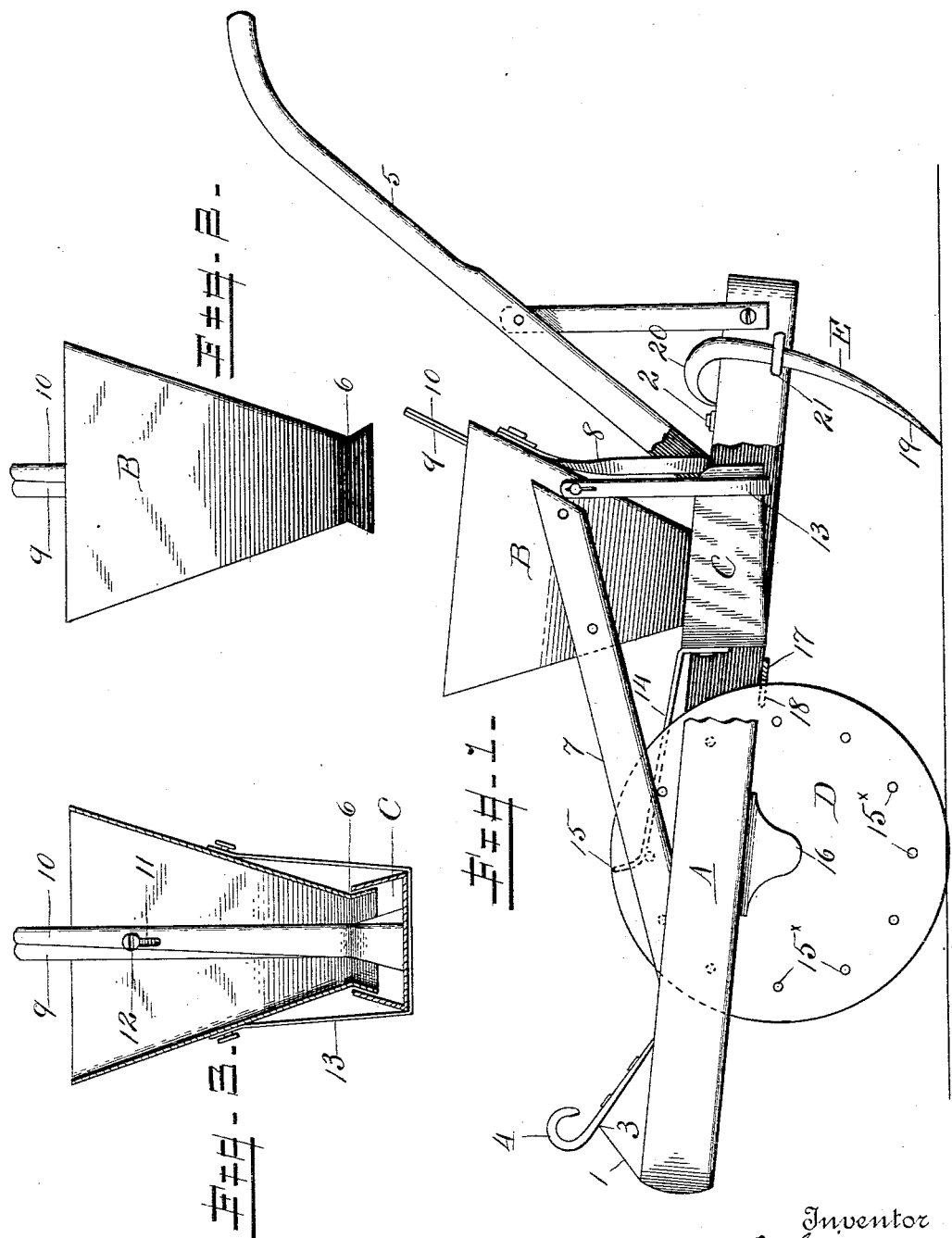

JOSEPH T. GRIFFITH, OF ORANGEBURG, SOUTH CAROLINA.

FERTILIZER-DISTRIBUTER.

SPECIFICATION forming part of Letters Patent No. 476,631, dated June 7, 1892.

Application filed July 28, 1891. Serial No. 400,980. (No model.)

*To all whom it may concern:*

Be it known that I, JOSEPH T. GRIFFITH, a citizen of the United States of America, residing at Orangeburg, in the county of Orangeburg and State of South Carolina, have invented a new and useful Fertilizer-Distributer, of which the following is a specification.

My invention relates to improvements in fertilizer-distributers; and the object is to provide a machine for distributing fertilizers which is simple in construction, effective in operation, and lasting in use.

I have fully and clearly illustrated my invention in the accompanying drawings, wherein—

Figure 1 is a side view of the machine, one of the beams being broken away to show the shaking chute or shoe. Fig. 2 is a view of the hopper, showing the flaring lower end. Fig. 3 is a transverse vertical central section of the hopper, also showing the stirrers. Fig. 4 is a perspective of the chute or shoe. Fig. 5 is a plan view with the hopper removed, and Fig. 6 is a detail view of one of the cultivator or covering teeth or plows.

A designates the beams of the frame, fastened at their front ends to a pull-block 1 by any suitable fastenings and arranged wider at their rear, as shown. A brace-bar 2 holds the beams in fixed position at their rear portions. The pull-block 1 is inclined upward from rear to front, as at 3, and the hook 4 secured on the incline, substantially as shown in the drawings, the purpose being that the rear of the frame may be easily raised when in operation. The handles 5 may be of any of the approved styles and be braced to withstand the uses for which intended.

B designates the hopper, the upper portion of which is of the usual construction; but the stem or neck is made flaring, as at 6, in order that the contents will not clog in the end, but will be freely and evenly deposited in the chute or shoe. The hopper is supported by brace-pieces 7, fastened to the sides and having their lower ends secured to the beams of the frame, as shown. At the rear of the hopper may be other braces 8 to give additional stability to the hopper. In the hopper are arranged stirrers 9 10, having a slot 11, in which is a supporting-lug 12. This means of securing and supporting the stirrers enables them to be swung laterally and lifted vertically on their support.

C designates the chute or shoe supported at the front by a bail 13, hung on the hopper, and in its arranged position hangs loosely beneath the end of the hopper, substantially as shown. At the rear of the shoe is secured a bar 14, having its free end 15 turned up to escape contact with the pins of the wheel, hereinafter described.

D designates a lantern or trundle wheel composed of two disks having the cross-pins $15^\times$ arranged between and securing the disks together. The pins $15^\times$ are arranged a distance within the rim of the disks, so that the wheel may travel on the edges without seriously interfering with the pins. The rod or bar 14 rests with its free end on the pins of the lantern-wheel and serves to shake the chute when the machine is in operation. The lantern-wheel D has its shaft journaled in bearings 16 on the frame, as shown. At the rear of the wheel D, across the frame, is secured a bar or plate 17, formed or provided with a projecting lug 18, which enters between the disks and sets with its end close to the pins and serves to clean the pins of the wheel of clods and débris which might accumulate thereon during the work.

E designates the plows, which consist of a single piece of metal or bar of proper-sized forging, having the lower end formed into a shovel or tooth 19 and the upper end bent forward and down, as at 20, and terminating in a point, as shown, to rest on and engage the upper face of the beam or frame, the curved upper portion being turned inward, so as to rest and set over on the top of the beam, as shown. The plows are secured to the beams by a single clip 21, let through the beams and bolted in position. This construction of the plows is very simple and at the same time very efficient and durable.

The operation is as follows: The hopper being supplied with the fertilizer and the machine drawn forward, which motion turns the lantern-wheel, and the rod connected to the chute being reciprocated the chute is shook and the fertilizer distributed therefrom.

Having thus described my invention, stated its principles, and specified its mode of operation, so as to distinguish it from other inven- tions in the art, I now proceed to particularly point out and distinctly claim the parts, improvements, and combinations of my invention as follows:

1. In a fertilizer-distributer, the hopper B, formed with the flaring stem or neck 6, substantially as described.

2. In a fertilizer-distributer, the combination of the hopper B, formed with the flaring stem or neck 6, the shoe hung on the lower end of the hopper, and means for agitating the shoe, substantially as described.

3. The plow-tooth herein described, consisting of a plow end and a stem bent over, down, and inward and terminating in a point adapted to rest on and engage the upper face of the frame, as specified.

In witness whereof I have hereto set my hand in the presence of two attesting witnesses.

JOSEPH T. GRIFFITH.

Attest:
THOMAS M. ROYER,
J. E. BULL.